(12) United States Patent
Kikuchi et al.

(10) Patent No.: US 9,477,510 B2
(45) Date of Patent: Oct. 25, 2016

(54) DETERMINATION METHOD AND DETERMINATION DEVICE

(71) Applicant: FUJITSU LIMITED, Kawasaki-shi, Kanagawa (JP)

(72) Inventors: Shinji Kikuchi, Yokohama (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/807,186

(22) Filed: Jul. 23, 2015

(65) Prior Publication Data
US 2016/0092260 A1 Mar. 31, 2016

(30) Foreign Application Priority Data

Sep. 29, 2014 (JP) .................................. 2014-199415

(51) Int. Cl.
G06F 9/455 (2006.01)
H04L 12/24 (2006.01)

(52) U.S. Cl.
CPC ....... *G06F 9/45558* (2013.01); *H04L 41/0816* (2013.01); *H04L 41/5054* (2013.01); *G06F 2009/4557* (2013.01)

(58) Field of Classification Search
CPC ................................................ G06F 9/45533
USPC .......................................................... 718/1
See application file for complete search history.

(56) References Cited

U.S. PATENT DOCUMENTS

2011/0161952 A1 6/2011 Poddar et al.
2011/0185063 A1 7/2011 Head et al.
2011/0219385 A1 9/2011 Jacobson et al.
2012/0054624 A1 3/2012 Owens, Jr. et al.
2012/0151476 A1 6/2012 Vincent
2015/0007176 A1* 1/2015 Kotani ................ G06F 9/45533
718/1
2015/0341221 A1* 11/2015 Vatnikov ............. H04L 41/0893
718/1
2016/0092266 A1* 3/2016 Bavishi ................ G06F 9/4856
718/1

FOREIGN PATENT DOCUMENTS

| JP | 2012-84129 | 4/2012 |
|---|---|---|
| JP | 2013-516668 | 5/2013 |
| JP | 2013-518330 | 5/2013 |
| JP | 2013-521578 | 6/2013 |
| JP | 2013-544417 | 12/2013 |

* cited by examiner

*Primary Examiner* — Andy Ho
(74) *Attorney, Agent, or Firm* — Oblon, McClelland, Maier & Neustadt, L.L.P.

(57) ABSTRACT

A determination method includes: receiving a request of a change from a first system configured by a first configuration to a second system configured by a second configuration, the request of the change including configuration data related to the first configuration and change data related to the change; extracting a functional requirement for a function that is realized in the first system based on the configuration data; identifying an operational requirement for realizing the first system based on the functional requirement and data about an operational process that is used for the first system; identifying a constraint condition about the second system based on configuration elements of the second configuration that are identified by the configuration data and the change data; and determining feasibility of the change to the second system based on the functional requirement, the operational requirement, and the constraint condition.

18 Claims, 26 Drawing Sheets

FIG. 6

| OPERATIONAL PROCESS P1 | | |
|---|---|---|
| EXECUTION TARGET ID | TRIGGER | SCRIPT TO BE EXECUTED |
| Function1 | Load average > 5 | C1_scale_up.sh |
| Function1 | Load average < 2 | C1_scale_down.sh |

FIG. 7

| CHANGE PROCESS | CHANGE TARGET ID | CHANGE CONTENT |
|---|---|---|
| move | VM1 | From C1 to C2 |
| move | VM2 | From C1 to C2 |

FIG. 8

VM1.deployed = C1
VM2.deployed = C1
VM3.deployed = C1
Function1.deployed = C1
} ARRANGEMENT OF VMS AND FUNCTION VM1.role = Web
VM2.role = Web
VM3.role = DB
Function1.role = LoadBalancer
} ROLES OF VMS AND FUNCTION

FIG. 9

```
DESIGN PATTERN 1: WEB AUTO-SCALING IN CLOUD

REQUIREMENTS FOR OPERATIONAL PROCESS
(1) INCLUDING SCALING-UP SCRIPT
(2) INCLUDING SCALING-DOWN SCRIPT

REQUIREMENTS FOR FUNCTIONAL REQUIREMENT
(1) INCLUDING LOAD BALANCER
(2) INCLUDING PLURAL WEB VMS
(3) LOCATIONS OF LOAD BALANCER AND WEB SERVER BEING SAME
```

FIG. 10

```
pred WebLoadBalance(){
    some p: process | some x,y,z: object |

(SCALE_UP + SCALE_DOWN) in (p.operation.script.purpose) &&
        p.operation.target = z &&

(x.role = Web && y.role = Web && x != y &&
        z.role = LoadBalancer && x.deployed = y.deployed && y.deployed = z.deployed)

```
fact{
Function2.deployed = C2
Function2.role = Firewall
}
```

FIG. 12

```
pred FirewallReq(){
    all disj w,x: object | all disj y,z: Cloud | some p: process | some t: task |

(x.role = Firewall && x.deployed = y && w.deployed = z) =>
    (t in p.operation) && (t.script.purpose = CONFIG_FIREWALL) &&
    (y in t.script.available)
}
```

FIG. 13

```
P1.operation = t1 + t2 t1.target = Function1
t1.script = c1_scale_up
t2.target = Function1
t2.script = c1_scale_down
```

FIG. 14

| SCRIPT TYPE | C1 | C2 | ... |
|---|---|---|---|
| SCALING-UP | C1_scale_up.sh | C2_scale_up.sh | ... |
| SCALING-DOWN | C1_scale_down.sh | C2_scale_down.sh | ... |
| FIREWALL SETTING | – | C2_config_fw.sh | ... |
| ⋮ | ⋮ | ⋮ | |

FIG. 15

```
c1_scale_up.purpose    = SCALE_UP
c1_scale_down.purpose  = SCALE_DOWN
c2_scale_up.purpose    = SCALE_UP
c2_scale_down.purpose  = SCALE_DOWN c1_scale_up.available    = C1
c1_scale_down.available  = C1
c2_scale_up.available    = C2
c2_scale_down.available  = C2
```

FIG. 16

```
   ⎧ one sig P1 extends process {}
   ⎪
   ⎪ one sig C1, C2 extends Cloud {}
   ⎪ one sig VM1, VM2, VM3 extends VM {}
 H ⎨ one sig t1, t2 extends task {}
   ⎪ one sig SCALE_UP, SCALE_DOWN extends purpose {}
   ⎪ one sig Function1 extends Function {}
   ⎪ one sig c1_scale_up, c2_scale_up, c1_scale_down, c2_scale_down extends script {}
   ⎩ one sig Web, LoadBalancer, DB extends role {}

//system configuration
fact { c1_scale_up.purpose   = SCALE_UP      ⎫
    c1_scale_down.purpose = SCALE_DOWN    ⎪
    c2_scale_up.purpose   = SCALE_UP      ⎪
    c2_scale_down.purpose = SCALE_DOWN    ⎬ X
                                          ⎪
    c1_scale_up.available   = C1          ⎪
    c1_scale_down.available = C1          ⎪
    c2_scale_up.available   = C2          ⎪
    c2_scale_down.available = C2          ⎭

P1.operation = t1 + t2                ⎫
                                          ⎪
    t1.target = Function1                 ⎬ Y
    t1.script = c1_scale_up               ⎪
    t2.target = Function1                 ⎪
    t2.script = c1_scale_down             ⎭

VM1.deployed = C1                     ⎫
    VM2.deployed = C1                     ⎪
    VM3.deployed = C1                     ⎪
    Function1.deployed = C1               ⎬ Z
                                          ⎪
    VM1.role = Web                        ⎪
    VM2.role = Web                        ⎪
    VM3.role = DB                         ⎪
    Function1.role = LoadBalancer         ⎭

```
one sig P1 extends process {} one sig C1, C2 extends Cloud {}
one sig VM1, VM2, VM3 extends VM {}
one sig t1, t2 extends task {}
one sig SCALE_UP, SCALE_DOWN extends purpose {}
one sig Function1 extends Function {}
one sig c1_scale_up, c2_scale_up, c1_scale_down, c2_scale_down extends script {}
one sig Web, LoadBalancer, DB extends role {}

//system configuration
fact { c1_scale_up.purpose    = SCALE_UP
c1_scale_down.purpose  = SCALE_DOWN
c2_scale_up.purpose    = SCALE_UP
c2_scale_down.purpose  = SCALE_DOWN c1_scale_up.available    = C1
c1_scale_down.available  = C1
c2_scale_up.available    = C2
c2_scale_down.available  = C2

P1.operation = t1 + t2 t1.target = Function1
t1.script = c1_scale_up
t2.target = Function1
t2.script = c1_scale_down VM1.deployed = C2          ─ M
VM2.deployed = C2
VM3.deployed = C1
Function1.deployed = C1

VM1.role = Web
VM2.role = Web
VM3.role = DB
Function1.role = LoadBalancer

}
```

DETERMINATION METHOD AND DETERMINATION DEVICE

CROSS-REFERENCE TO RELATED APPLICATION

This application is based upon and claims the benefit of priority of the prior Japanese Patent Application No. 2014-199415, filed on Sep. 29, 2014, the entire contents of which are incorporated herein by reference.

FIELD

The embodiment discussed herein is related to a technology that supports a configuration change of a virtual system which includes plural virtual machines.

BACKGROUND

In recent years, the use of cloud computing has been popularized and it makes a transition from a stage where a user constructs a system in accordance with requirements of a specific cloud to a stage where a business is realized by further combining various clouds depending on the circumstances.

For example, application migration may be performed, in which a business is started with a small system by using a public cloud and an application is thereafter moved to a private cloud with high cost performance in response to an expansion of the business. Further, cloud bursting may be performed, in which the services run by the private cloud are temporarily overloaded and the load is thus distributed by replicating a portion of functions of the application in the public cloud.

As described above, a system configuration is not unchanged from the first design and construction but may be changed anytime. Further, in a case where the clouds are used in combination, various changes may occur to the combination itself. Examples of technologies related to the above are disclosed in Japanese National Publication of International Patent Application No. 2013-516668, Japanese National Publication of International Patent Application No. 2013-544417, and Japanese Laid-open Patent Publication No. 2012-84129.

SUMMARY

According to an aspect of the invention, a determination method executed by a computer includes: receiving a request of a change from a first system configured by a first configuration to a second system configured by a second configuration, the request of the change including configuration data related to the first configuration and change data related to the change from the first configuration to the second configuration; extracting a functional requirement for a function that is realized in the first system based on the configuration data; identifying an operational requirement for realizing the first system based on the functional requirement and data about an operational process that is used for the first system; identifying a constraint condition about the second system based on configuration elements of the second configuration that are identified by the configuration data and the change data; and determining feasibility of the change to the second system based on the functional requirement, the operational requirement, and the constraint condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram that illustrates one example of an operational process definition of the virtual system that is yet to be changed;

FIG. 7 is a diagram that illustrates one example of system change data;

FIG. 8 is a diagram that illustrates one example of a functional requirement;

FIG. 9 is a diagram that illustrates one example of a design pattern;

FIG. 10 is a diagram that illustrates one example of the design pattern that is described in a form of predicate logic formula;

FIG. 11 is a diagram that illustrates one example of provider constraint data that are specific to a provider;

FIG. 12 is a diagram that illustrates one example of a constraint condition common to providers (firewall requirement);

FIG. 13 is a diagram that illustrates one example of the operational process definition that is described in the form of predicate logic formula;

FIG. 14 is a diagram that illustrates one example of data that are stored in a script storage unit;

FIG. 15 is a diagram that illustrates one example of data of the script that is described in the form of predicate logic formula;

FIG. 16 is a diagram that illustrates one example of first data that are input to a constraint satisfaction analysis unit;

FIG. 18 is a diagram that illustrates the changed first data;

DESCRIPTION OF EMBODIMENT

In a case where a function run by an infrastructure of a certain cloud (for example, cloud A) is moved to or replicated in another cloud (for example, cloud B), the function may not normally operate in the cloud B even if the function normally operates in the cloud A.

For example, there may be a case where the cloud A standardly provides a load distribution function but the cloud B has no load distribution function. If an attempt to use the cloud B is made in such a case, the cloud B starts an additional virtual machine and executes an operational process to prepare the load distribution function by the cloud B itself.

Further, in a case of moving a portion of applications executed by a service that is run in the cloud A which has no firewall to the cloud B that has the firewall, the communication between the cloud A and the cloud B may be blocked. Thus, an operational process for correctly performing firewall setting is executed.

The operational process is often realized by a script for realizing the functions of an intended virtual system and is defined by a trigger and a process. The trigger represents a starter of execution of a process, and a process represents contents of a process performed for a system or an application.

Specifically, the trigger in the operational process for scaling-out of a web server in order to handle an overload is detection of the overload of the web server, and the process includes starting of an additional web server and deployment of an application.

Further, the trigger in the operational process for periodic backup of data is a prescribed time of day, and the process is copying data of a database server to a backup storage.

In general, in a case where an operation management tool (for example, Scalr) monitors an event via an agent and the event corresponds to the trigger of the operational process, the process that corresponds to the trigger is executed.

Even if a configuration change of the virtual system such as an application migration or cloud bursting as described above is planned, it is often difficult for a user to determine whether the configuration change of the virtual system may be realized without any problem.

Accordingly, it is desired to provide a technology that supports a user in a configuration change of a virtual system.

Figure 1:
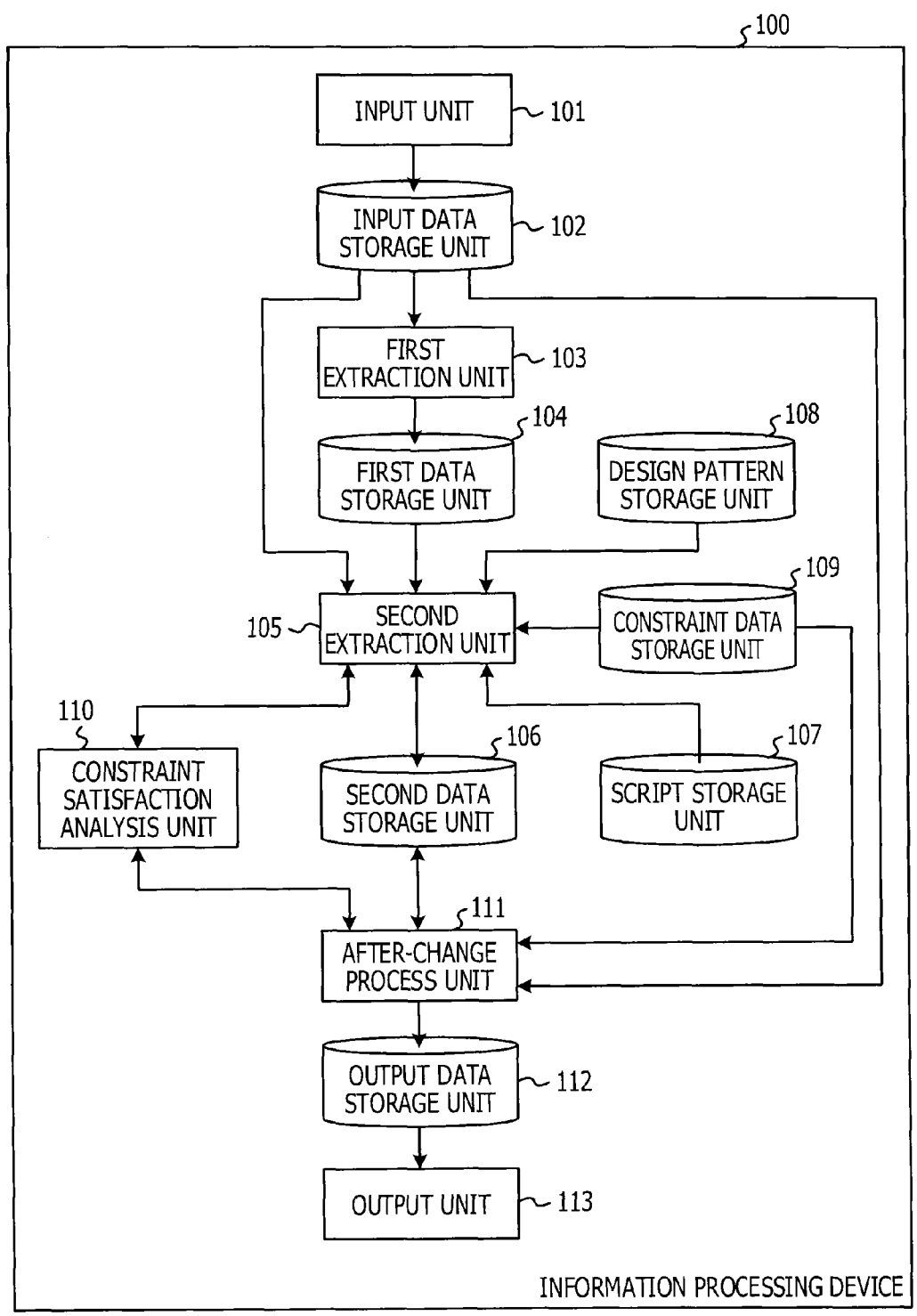
FIG. 1 is a diagram that illustrates a configuration example of an information processing device according to an embodiment.

A function configuration example of an information processing device 100 according to this embodiment is illustrated in FIG. 1. The information processing device 100 has an input unit 101, an input data storage unit 102, a first extraction unit 103, a first data storage unit 104, a second extraction unit 105, a second data storage unit 106, a script storage unit 107, a design pattern storage unit 108, a constraint data storage unit 109, a constraint satisfaction analysis unit 110, an after-change process unit 111, an output data storage unit 112, and an output unit 113.

The input unit 101 receives an input of data related to a configuration change of the virtual system from the user or another computer and stores the data in the input data storage unit 102. The first extraction unit 103 extracts a functional requirement of a function realized by the virtual system that is yet to be changed from the data stored in the input data storage unit 102 and stores the data about the functional requirement in the first data storage unit 104. More specifically, the functional requirement includes configurations of components that are directly used to provide a requested function (for example, web server, DB server, firewall, and so forth).

The design pattern storage unit 108 stores a design pattern that includes requirements for a function for realizing an operational requirement and data of a script desired to be executed in relation to the function, with respect to each operational requirement.

The constraint data storage unit 109 stores data about constraint conditions that are specific to a provider and data about constraint conditions that are common to providers. The constraint conditions that are specific to the provider are a condition that the firewall has to be provided for a particular cloud, a condition that a load balancing function is standardly provided in another particular cloud, and so forth. Further, the constraint conditions that are common to the providers include requirements for the function for realizing the firewall and data about an operational process desired to be executed in relation to the function.

The script storage unit 107 stores data of a script for an operational process.

The second extraction unit 105 extracts the operational requirement of the virtual system yet to be changed by using the data stored in the input data storage unit 102, the first data storage unit 104, the design pattern storage unit 108, the constraint data storage unit 109, and the script storage unit 107 and stores the data used in a process and the data about the operational requirement in the second data storage unit 106. The second extraction unit 105 cooperates with the constraint satisfaction analysis unit 110 to perform the process. The constraint satisfaction analysis unit 110 is a verification apparatus (solver) such as the Alloy Analyzer, for example, and determines whether or not the configuration of the virtual system yet to be changed (the configuration that is identified by the function and the operational process) satisfies the given operational requirement (that is, the design pattern) and the constraint conditions of the provider, for example.

The after-change process unit 111 determines whether or not the configuration change of the virtual system related to an inquiry of the user is feasible by using the data stored in the input data storage unit 102, the constraint data storage unit 109, the script storage unit 107, and the second data storage unit 106. Here, the after-change process unit 111 also cooperates with the constraint satisfaction analysis unit 110 to perform the process. That is, the constraint satisfaction analysis unit 110 determines whether or not the configuration of the changed virtual system (the configuration that is identified by the function and the operational process) satisfies the extracted operational requirement and the constraint conditions of the provider.

In a case where the configuration change of the virtual system is feasible, the after-change process unit 111 stores data about the configuration change and so forth in the output data storage unit 112.

In a case where a determination is made that the configuration change of the virtual system is not feasible, the after-change process unit 111 cooperates with the constraint satisfaction analysis unit 110 to identify a function, an operational process, or both of those to be added in order to satisfy the extracted operational requirement and the constraint conditions of the providers and stores the data about the configuration to be added and data about the configuration resulting from the addition of the configuration to be added in the output data storage unit 112.

The output unit 113 outputs data stored in the output data storage unit 112 to output devices such as a display device, a printing device, and another computer.

Next, process contents of the information processing device 100 will be described with reference to FIGS. 2 to 25.

Figure 2:
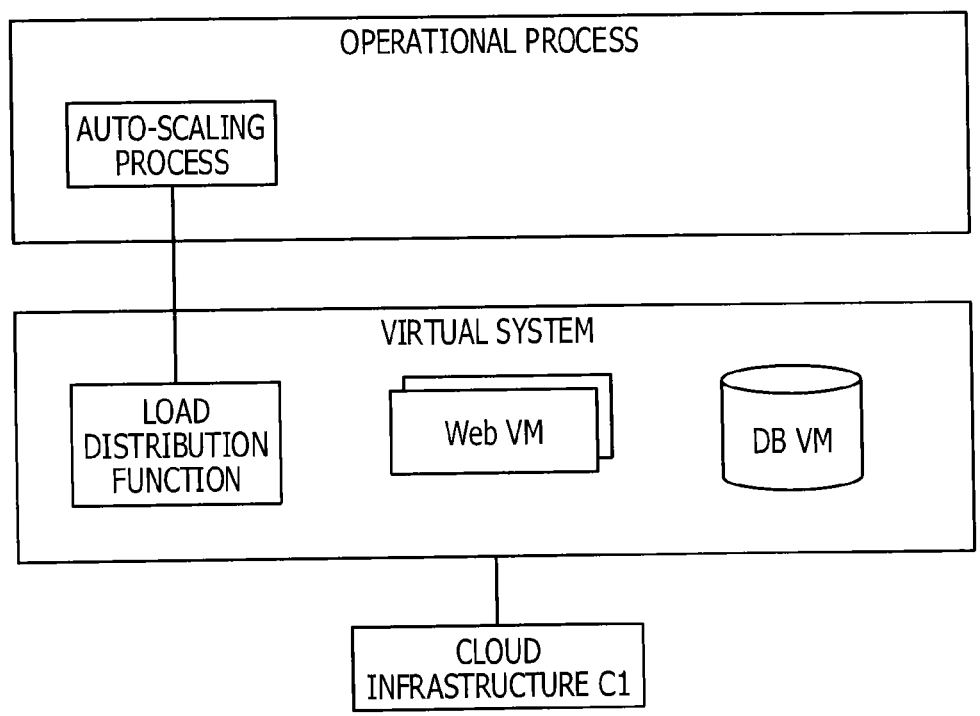
FIG. 2 is a diagram that illustrates one example of a virtual system that is yet to be changed.

For easy understanding of the process contents, the virtual system illustrated in FIG. 2 is assumed as the virtual system that is yet to be changed.

That is, the virtual system yet to be changed includes plural web virtual machines (VMs) that operate as front-end web servers and a DB VM that operates as a database (DB) server for storing data. The virtual system yet to be changed runs on a cloud infrastructure C1. Further, the virtual system yet to be changed uses a load distribution function (load balancer) that is standardly provided by the cloud infrastructure C1 to distribute a load to the plural web VMs. More specifically, the load balancer executes auto-scaling that increases or decreases the web VMs based on load information of the web VMs. An auto-scaling process is executed as the operational process in order to realize the load distribution function as intended by the user.

Figure 3:
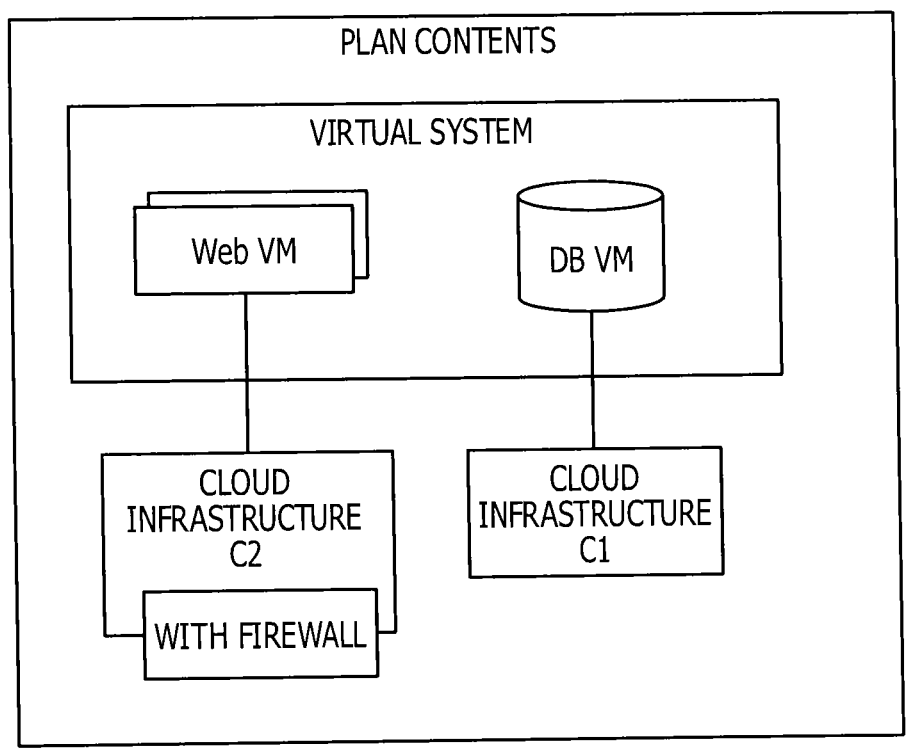
FIG. 3 is a diagram that illustrates one example of the changed virtual system.

Meanwhile, an administrator of the system plans a change into a system illustrated in FIG. 3. That is, a cloud infrastructure C2 that is more inexpensive than the cloud infrastructure C1 emerges, and the front-end web VMs are thus moved to the cloud infrastructure C2. On the other hand, the DB VM is maintained on the cloud infrastructure C1. However, the load distribution function that is standardly provided in the cloud infrastructure C1 is not provided in the cloud infrastructure C2. Further, the firewall has to be used in the cloud infrastructure C2.

Figure 4:
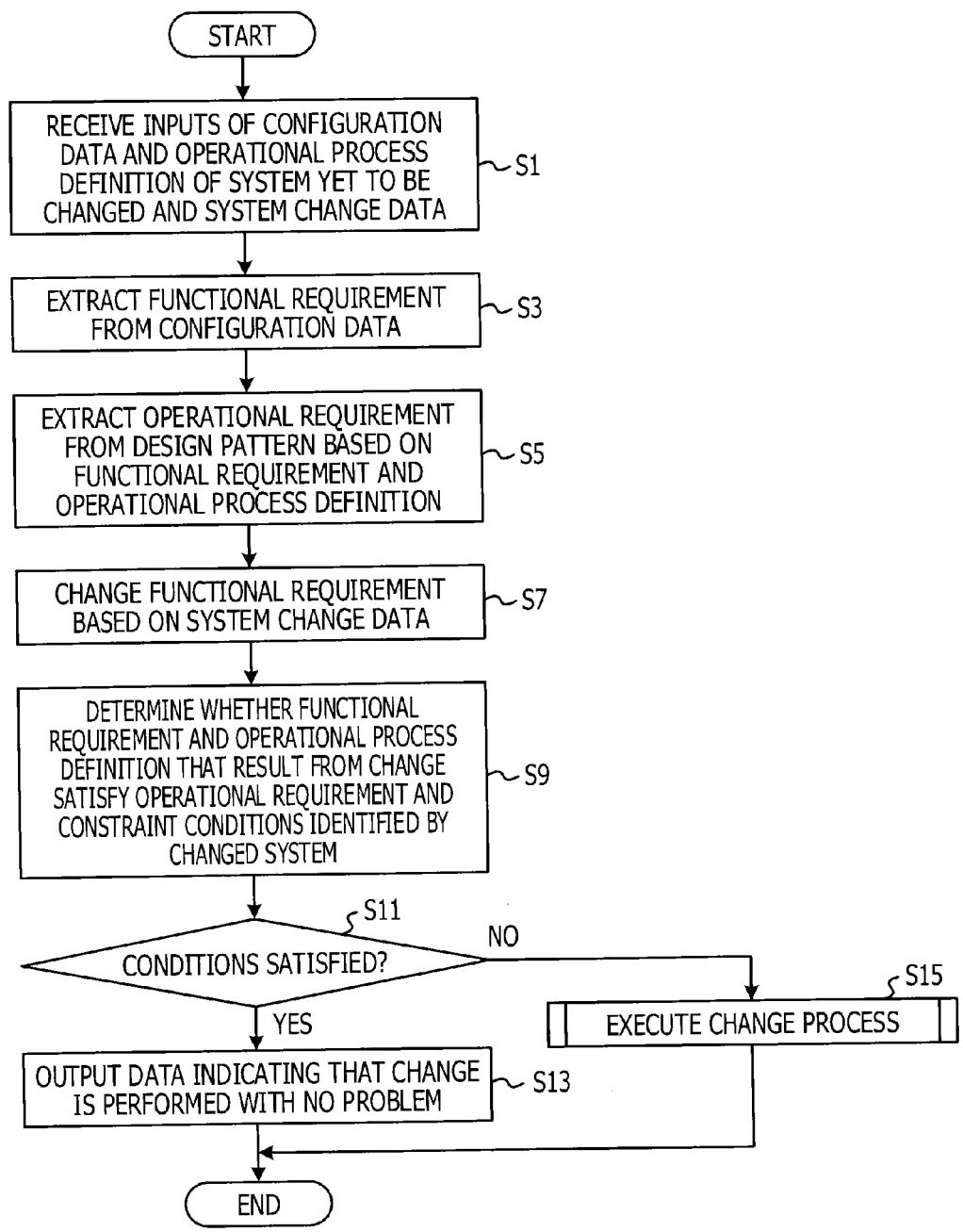
FIG. 4 is a diagram that illustrates a process flow according to the embodiment.

The input unit 101 first receives inputs of configuration data and an operational process definition of the virtual system yet to be changed and system change data and stores those in the input data storage unit 102 (FIG. 4: step S1). The input unit 101 may obtain such data from another computer (the virtual system yet to be changed depending on the case).

Figure 5:
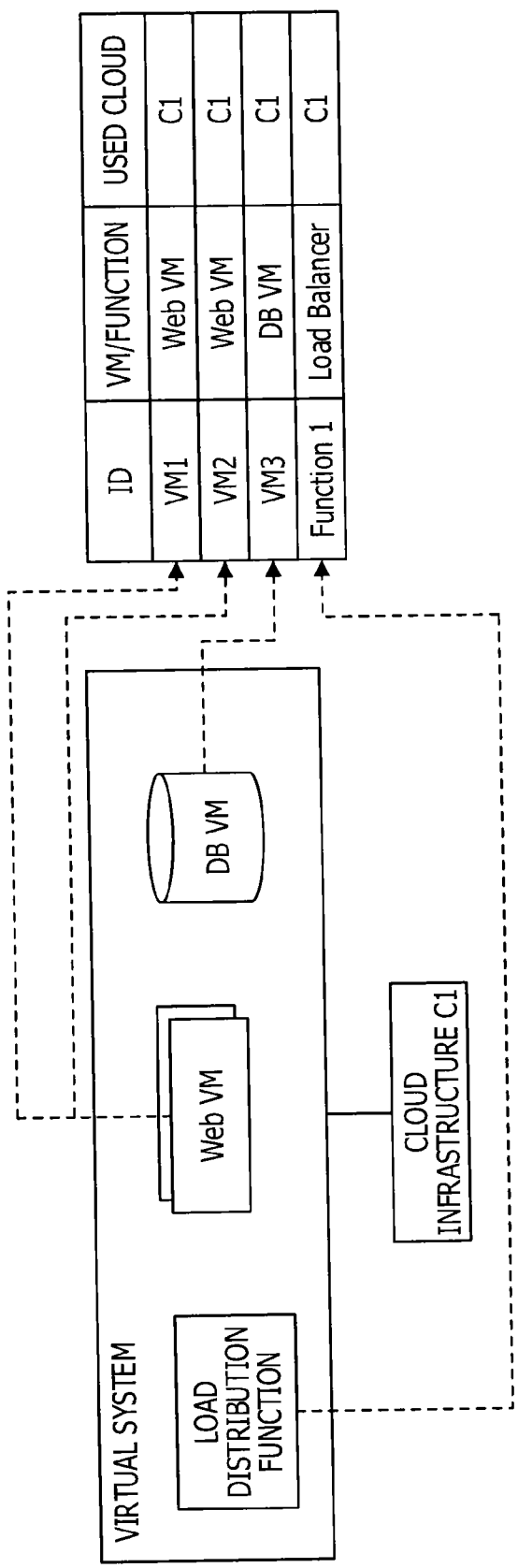
FIG. 5 is a diagram that illustrates one example of configuration data of the virtual system that is yet to be changed.

The configuration data are data about the virtual machines and functions of the virtual system yet to be changed as schematically illustrated in FIG. 5, for example. In the example of FIG. 5, the virtual system yet to be changed that is installed in the cloud infrastructure C1 includes two web VMs, one DB VM, and the load balancer that is standardly provided in the cloud infrastructure C1. Identifiers (ID) are arbitrarily set.

Further, the operational process definition of the virtual system yet to be changed is data illustrated in FIG. 6, for example. In the example of FIG. 6, each of the operational processes includes application targets of the operational process, triggers, and process contents (names of scripts to be executed). More specifically, an operational process P1 is applied to the virtual system yet to be changed, an execution target of the operational process P1 is Function1 (load balancer). Then, the operational process P1 includes the two kinds of triggers (in a case where the load average is larger than 5 and a case where the load average is smaller than 2) and the scripts to be executed in accordance with the triggers.

In addition, the system change data are data illustrated in FIG. 7, for example. That is, the system change data include change processes (add, delete, move, modify, and so forth), IDs of functions as targets of changes, and change contents.

The first extraction unit 103 next extracts the functional requirement from the configuration data stored in the input data storage unit 102 (step S3). In this embodiment, the configuration data are converted into the functional requirement in the form of predicate logic formula so that the configuration data may be processed by the constraint satisfaction analysis unit 110. More specifically, the configuration data are converted into descriptions that include descriptions about arrangement of the VMs and the function and descriptions about roles (functions) of the VMs and the function. In the example illustrated in FIG. 5, as illustrated in FIG. 8, the cloud infrastructure C1 is set for an attribute of arrangement "deployed" of the VMs and the function, and Web, DB, or LoadBalancer is set for an attribute of roles "role" of the VMs and the function.

Further, the second extraction unit 105 extracts the operational requirement from the design pattern stored in the design pattern storage unit 108 based on the operational process definition stored in the input data storage unit 102, the functional requirement stored in the first data storage unit 104, and the data stored in the constraint data storage unit 109 and the script storage unit 107 and stores the data of the operational requirement and data that are being processed in the second data storage unit 106 (step S5).

The design pattern is data, as illustrated in FIG. 9, that are expressed in the form of predicate logic formula, for example. FIG. 9 illustrates the design pattern for web auto-scaling in the cloud and includes requirements for the operational process and requirements for the functional requirement. As described above, the operational requirement for the functions to be realized and used in the virtual system is provided as the design pattern.

The design pattern is also described in the form of predicate logic formula so that the design pattern may be interpreted by the constraint satisfaction analysis unit 110. The example of FIG. 9 is expressed as FIG. 10. In FIG. 10, the upper stage expresses the requirements for the operational process in which the purposes of the script for a process p are scaling-up and scaling-down and the process p is implemented in an object z (which is also referred to as resource and is a function provided in the VM or the cloud). The lower stage expresses the requirements for the functional requirement in which the roles of objects x and y are web, the role of the object z is the load balancer, and the object x, y, and z are implemented in the same cloud.

The data stored in the constraint data storage unit 109 include the constraint conditions that are common to the providers and the provider constraint data that are specific to the provider. In the cloud infrastructure C1, the load balancer is standardly provided, but the load balancer does not have to be used. Accordingly, in the above-described example, the provider constraint data about the cloud infrastructure C1 are not present.

On the other hand, the firewall has to be provided in the cloud infrastructure C2. Thus, the provider constraint data are data illustrated in FIG. 11. The example of FIG. 11 describes that the firewall has to be provided in the cloud infrastructure C2. Further, a firewall requirement in a case of using the firewall is provided as the constraint condition common to the providers.

The firewall requirement is the constraint condition that in a case where a system across the firewall is constructed, specifically, in a case where plural cloud infrastructures are used and at least one of those has the firewall, scripts for setting the firewall of all the cloud infrastructures are executed to enable communication. The firewall requirement as the constraint condition common to providers is expressed as illustrated in FIG. 12, for example.

In the example of FIG. 12, in a case where the role of the object x is the firewall and deployed in a cloud y and an object w that is different from the object x is deployed in a cloud z that is different from the cloud y, the requirements are that a task t (which is substantially execution of the script) is included in a set of operations for an operational process p, the purpose of the script of the task t is firewall setting (CONFIG_FIREWALL), and the script of the task t is usable in the cloud y.

Further, the operational process definition stored in the input data storage unit 102 is converted into data in the form of predicate logic formula so that the operational process definition may be processed by the constraint satisfaction analysis unit 110. The example in FIG. 6 is converted into the form illustrated in FIG. 13, for example. The example of FIG. 13 expresses that the operational process P1 includes tasks t1 and t2, the task t1 is the task by a script of c1_scale_up and is executed for the function Function1, and the task t2 is the task by a script of c1_scale_down and is executed for the function Function1. No trigger is used in this embodiment.

In addition, the script storage unit 107 stores data that are schematically illustrated in FIG. 14. In the example of the FIG. 14, types of scripts, names of the scripts of the operational processes that are executable in the cloud infrastructure C1 for the respective types of scripts, and names of the scripts of the operational processes that are executable in the cloud infrastructure C2 for the respective types of scripts are registered.

Such data are converted into data in the form of predicate logic formula so that the data may be processed by the constraint satisfaction analysis unit 110 and stored in the script storage unit 107. For example, the data are expressed by data illustrated in FIG. 15. In the example of FIG. 15, the purpose is defined with respect to each of the scripts, and the cloud in which the script is executable is defined with respect to each of the scripts.

In this embodiment, first data illustrated in FIG. 16 are generated by combining the functional requirement, the operational process definition, and data of the scripts together. In the example illustrated in FIG. 16, a portion X of the data of the scripts, a portion Y of the operational process definition, a portion Z of the functional requirement, and a definition portion H related to the portions X, Y, and Z are coupled together.

The definition portion H defines the operational processes, the clouds, the VMs, the tasks, the purposes, the functions, the scripts, and the roles that appear in the portions X, Y, and Z.

Further, the second extraction unit 105 extracts second data related to such first data from the constraint data storage unit 109. That is, the second extraction unit 105 reads out the provider constraint data specific to the providers that are related to the clouds which are deployment destinations and the constraint conditions common to the providers that are related to the provider constraint data. In the above-described example, the provider constraint data specific to the provider about the cloud infrastructure C1 are not present. Thus, the constraint conditions common to the providers are not read out either.

In addition, the second extraction unit 105 reads out the design patterns one by one from the design pattern storage unit 108, outputs the design patterns together with the first and second data to the constraint satisfaction analysis unit 110, and causes the constraint satisfaction analysis unit 110 to determine whether or not the first data (the functional requirement and the operational process definition) satisfy the constraint conditions of the second data and the operational requirement provided by the design pattern. In this embodiment, in a case where the first data satisfy the constraint conditions of the second data and the operational requirement provided by the design pattern, the constraint satisfaction analysis unit 110 outputs data indicating that the conditions are satisfied and the implementation example. In a case where the data indicating that the conditions are satisfied are obtained, the second extraction unit 105 identifies the design pattern output in this case as the operational requirement. On the other hand, in a case where the first data do not satisfy the constraint conditions of the second data and the operational requirement provided by the design pattern, data indicating that the conditions are not satisfied are output.

In a case where the constraint satisfaction analysis unit 110 is caused to process any one of the design patterns and the result indicating that the conditions are satisfied may not be obtained, the second extraction unit 105 causes the constraint satisfaction analysis unit 110 to process all combinations of two or more design patterns and thereby identifies the design pattern that provides the output indicating that the conditions are satisfied as the operational requirement.

In this embodiment, the identified operational requirement, the implementation example thereof, the first data, and the second data are stored in the second data storage unit 106.

Figure 17:
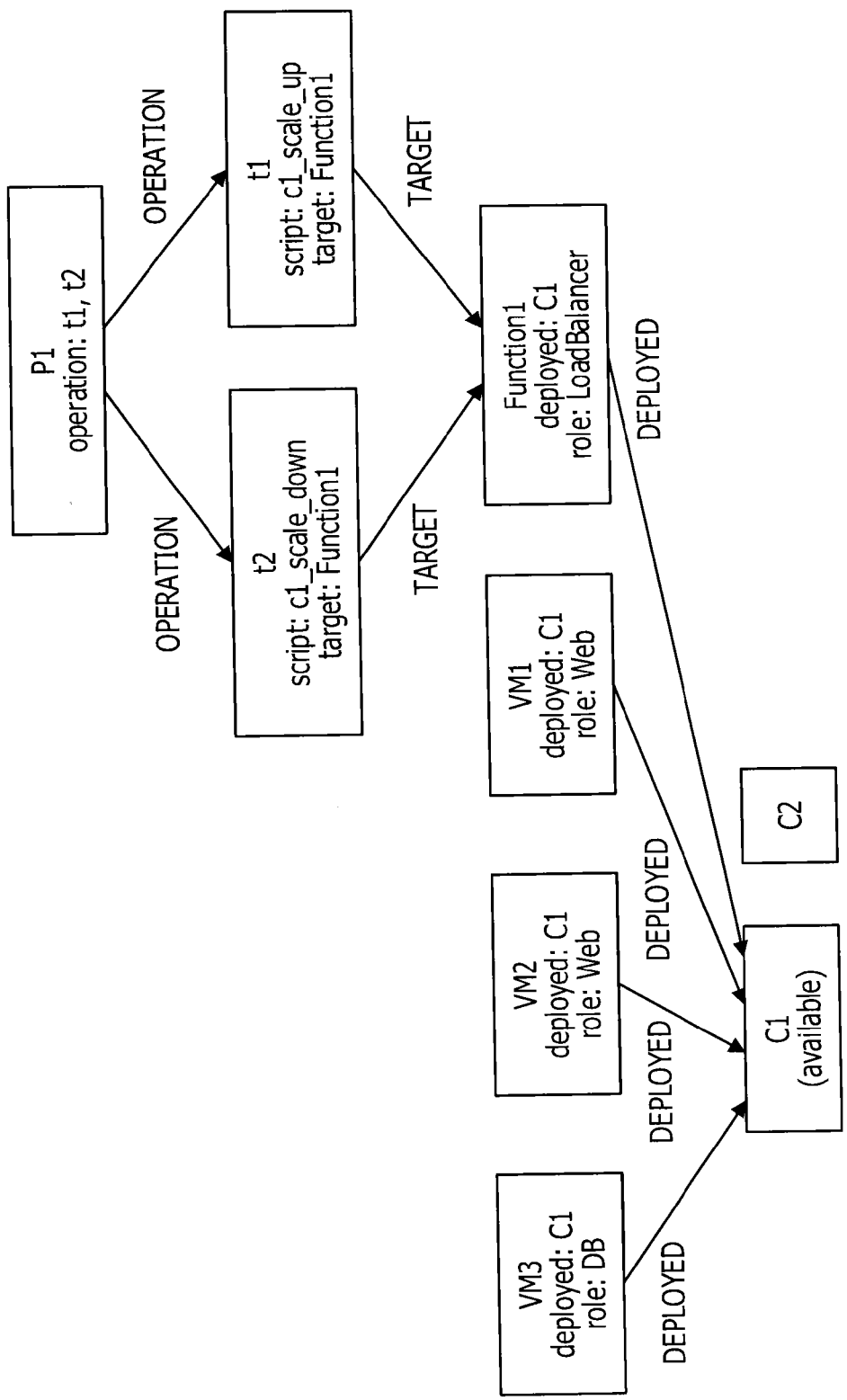
FIG. 17 is a diagram that illustrates an implementation example in a case where conditions are satisfied.

In general, because the virtual system yet to be changed is running, at least one design pattern that satisfies the conditions is identified. In the above-descried example, the design pattern for the web auto-scaling in the cloud, which is illustrated in FIG. 9, is extracted. Further, in the above-described example, data of an implementation example illustrated in FIG. 17 are output from the constraint satisfaction analysis unit 110. FIG. 17 substantially illustrates the virtual system illustrated in FIG. 2.

Next, the after-change process unit 111 changes the data of the functional requirement (more specifically, the first data (FIG. 16)) stored in the second data storage unit 106 based on the system change data and stores the changed data in the second data storage unit 106, for example (step S7).

In a case where the system change data illustrated in FIG. 7 are obtained, the deployment destinations of the web VMs are changed from the cloud infrastructure C1 to the cloud infrastructure C2. Thus, as illustrated in FIG. 18, a portion M of the functional requirement reflects the change in the first data.

Then, the after-change process unit 111 extracts third data related to the changed first data (that is, the functional requirement and the operational process definition that result from the change) from the constraint data storage unit 109. That is, the after-change process unit 111 reads out the provider constraint data specific to the providers that are related to the clouds which are the deployment destinations and the constraint conditions common to the providers that are related to the provider constraint data. Here, because the deployment destinations of the VMs and the function are the cloud infrastructure C1 and the cloud infrastructure C2, the after-change process unit 111 extracts the provider constraint data specific to the provider about the cloud infrastructure C2 and the constraint conditions common to the providers that are related to the provider constraint data. The provider constraint data specific to the provider about the cloud infrastructure C1 are not present. Thus, data about the cloud infrastructure C1 may not be obtained. Accordingly, the data illustrated in FIGS. 11 and 12 serve as the third data.

The after-change process unit 111 thereafter causes the constraint satisfaction analysis unit 110 to determine whether or not the changed first data satisfy the constraint conditions of the third data and the operational requirement provided by the extracted design pattern (step S9).

Similarly to step S5, in a case where a determination is made that the conditions are satisfied, the constraint satisfaction analysis unit 110 outputs the data indicating the determination and an implementation example. In a case where a determination is made that the conditions are not satisfied, the constraint satisfaction analysis unit 110 outputs the data indicating the determination.

In the above-described example, the changed first data do not include a description about the firewall despite the fact that the setting of the firewall has to be made in the cloud infrastructure C2. Thus, a determination is made that the conditions are not satisfied.

However, in a case where the constraint satisfaction analysis unit 110 determines that the conditions are satisfied (step S11: Yes route), the after-change process unit 111 stores the data of the determination result and the implementation example in the output data storage unit 112. Then, the output unit 113 outputs the data and so forth that indicate that the system change may be performed with no problem (which may include the data of the implementation example) from the data stored in the output data storage unit 112 to the output device (step S13).

The above procedures allows an operational administrator to recognize that the planned system change may be executed without any revision.

On the other hand, in a case where the constraint satisfaction analysis unit 110 determines that the conditions are not satisfied (step S11: No route), the after-change process unit 111 and the constraint satisfaction analysis unit 110 execute the change process about the functions and the operational processes (step S15). The process thereafter finishes. The change process will be described with reference to FIGS. 19 to 25.

Figure 19:
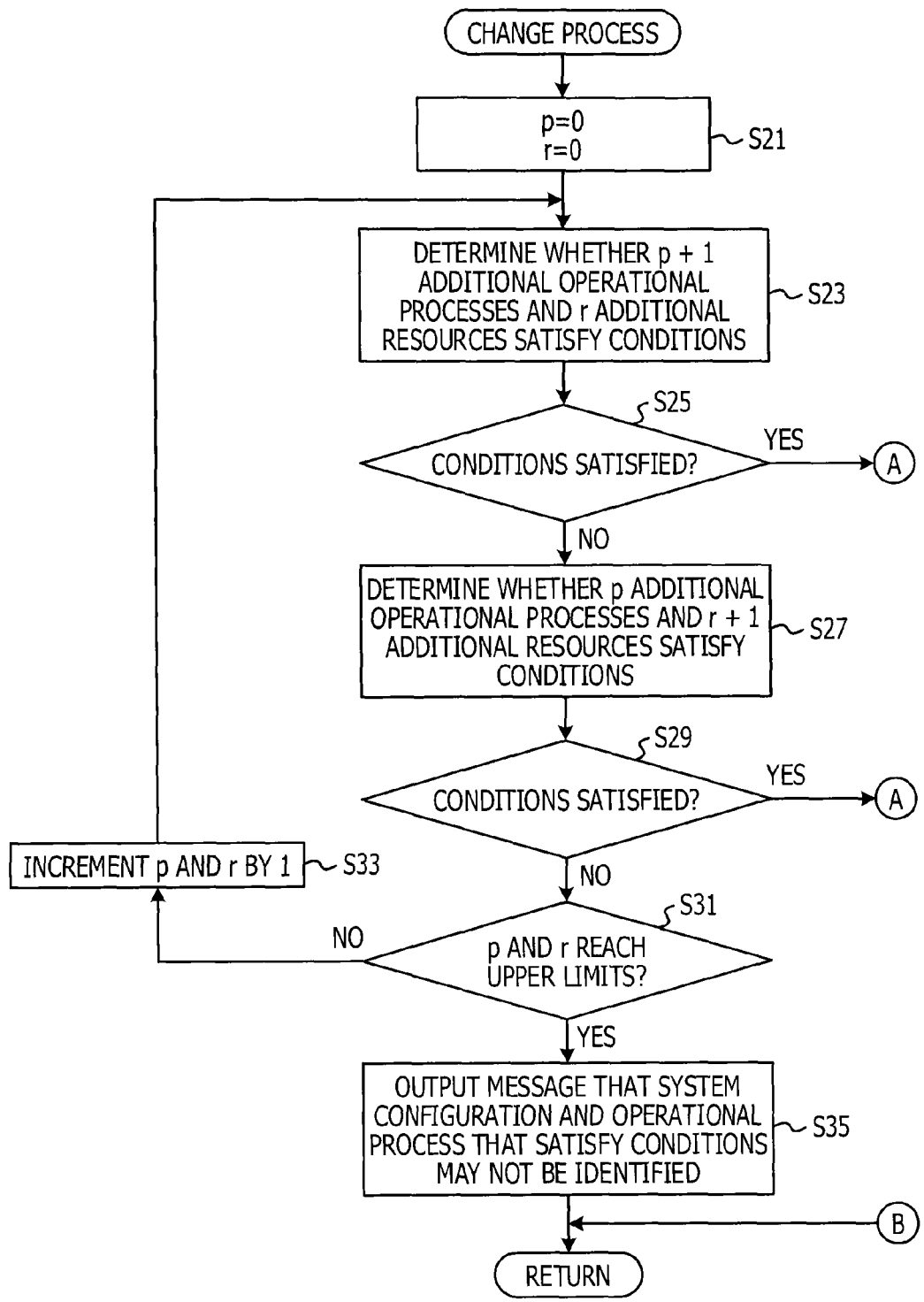
FIG. 19 is a diagram that illustrates a process flow of a change process.

First, the after-change process unit 111 initializes a counter p about the number of the operational processes to be added and a counter r about the number of resources (for example, virtual machines) to be added to 0 (FIG. 19: step S21).

The after-change process unit 111 thereafter adds p+1 operational processes and r resources (for example, VMs) to the changed first data and then causes the constraint satisfaction analysis unit 110 to determine whether or not the constraint conditions of the third data and the operational requirement provided by the extracted design pattern may be satisfied (step S23).

In this embodiment, operational processes or resources that are lacking are first added, and an operable virtual system is thereby identified.

Figure 20:
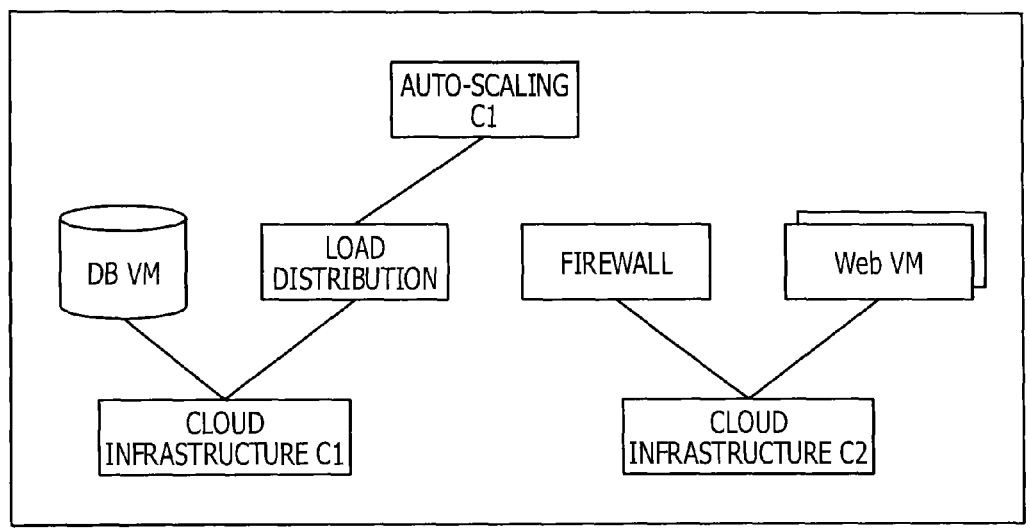
FIG. 20 is a diagram for illustrating a specific example of the change process.
Figure 21:
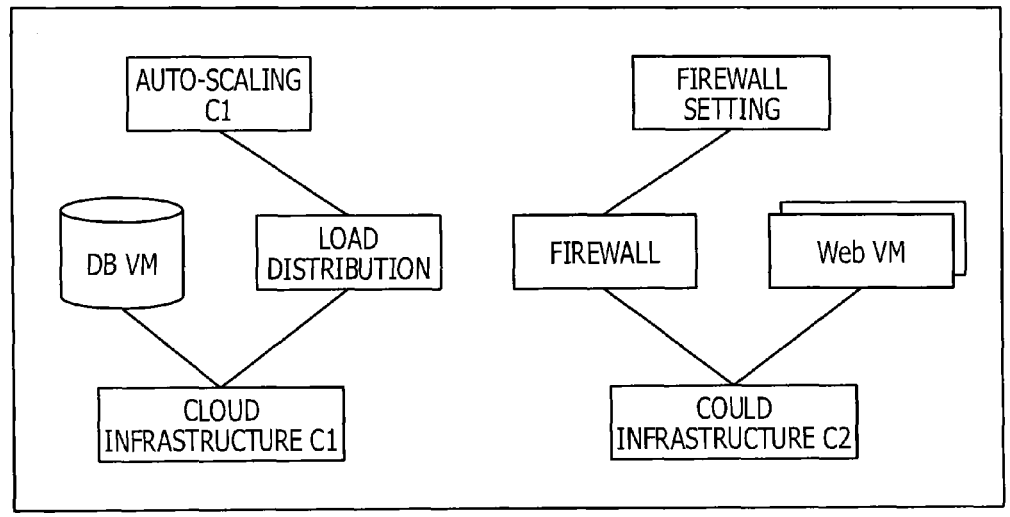
FIG. 21 is a diagram for illustrating a specific example of the change process.

Initially, a determination is made whether or not the conditions are satisfied by adding one operational process. A state where the system change data are simply applied is the state which is schematically illustrated in FIG. 20. In this state, the requirement for the web auto-scaling in the cloud is not satisfied because the web VM on the cloud infrastructure C2 lacks the function of the load balancer and the operational process, and the operational process for the firewall that has to be provided in the cloud infrastructure C2 is not applied. Thus, the provider constraint conditions are not satisfied. However, when one operational process of the firewall setting is added, for example, a state which is schematically illustrated in FIG. 21 is obtained. The above procedure allows the problem about the firewall to be solved. However, because the requirement for the web auto-scaling in the cloud is not satisfied, it is not determined that the conditions are satisfied. What kinds of operational processes are added is determined by a round-robin method, for example. In this case, the changed first data are caused to reflect the addition of the resource and so forth, for example.

In a case where a determination is made that the conditions are satisfied (step S25: Yes route), the process moves to the process in FIG. 24 via a terminal A. On the other hand, in a case where a determination is made that the conditions are not satisfied (step S25: No route), the after-change process unit 111 adds p operational processes and r+1 resources (for example, VMs) to the changed first data and then causes the constraint satisfaction analysis unit 110 to determine whether or not the constraint conditions of the third data and the operational requirement provided by the extracted design pattern may be satisfied (step S27). In this case, the changed first data are caused to reflect the addition of the resource and so forth, for example.

Figure 22:
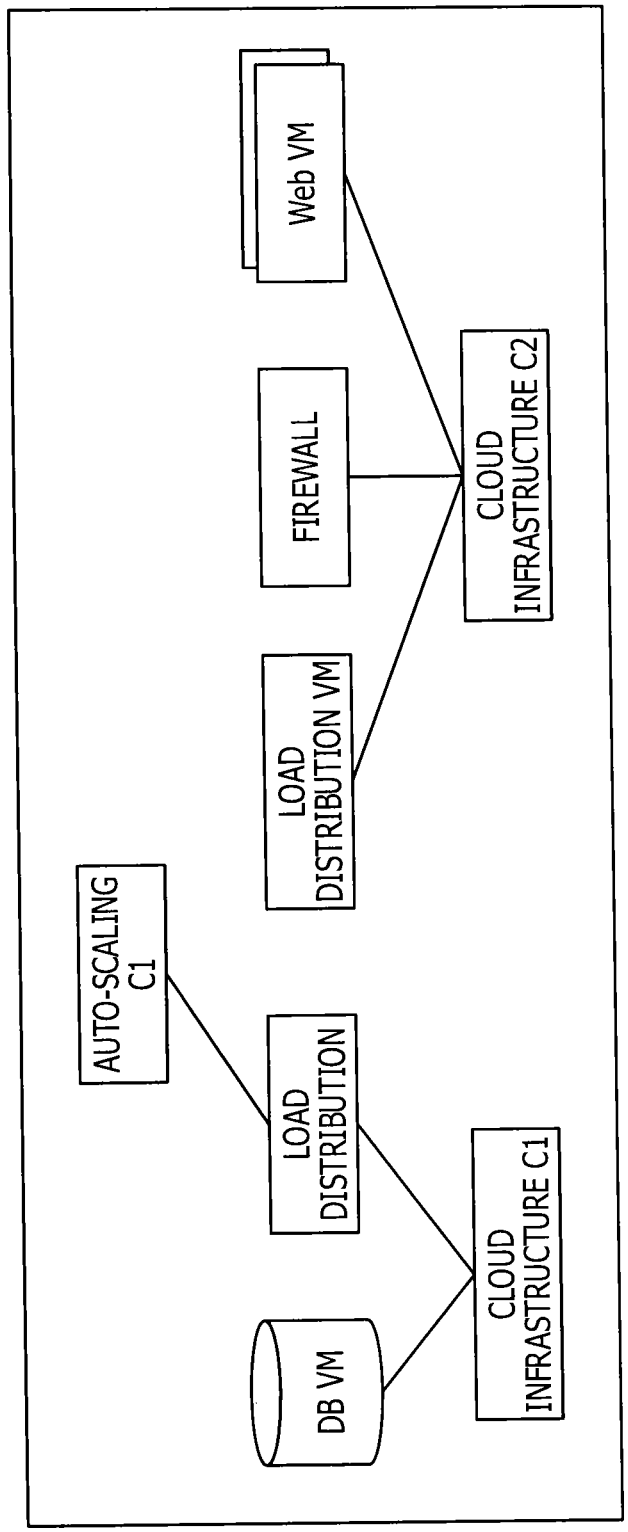
FIG. 22 is a diagram for illustrating a specific example of the change process.

For example, as schematically illustrated in FIG. 22, even if the a load distribution VM is added to the state of FIG. 20 as an additional resource, a determination is not made that the conditions are satisfied because an operational process is not applied to the load distribution VM.

In a case where a determination is made that the conditions are satisfied (step S29: Yes route), the process moves to the process in FIG. 24 via the terminal A. On the other hand, in a case where a determination is made that the conditions are not satisfied (step S29: No route), the after-change process unit 111 determines whether or not values p and r reach the predetermined upper limit values (step S31). In a case where the values p and r do not reach condition values, the after-change process unit 111 increments the values p and r by 1 (step S33). Then, the process returns to step S23.

In this example, when the values p and r become p=1 and r=1, in step S23, two operational processes and one resource are added. Here, the firewall setting and the auto-scaling are selected as the additional operational processes, and the load distribution VM is selected as the additional resource. Then, the auto-scaling in the cloud infrastructure C2 is enabled, and the firewall for the cloud infrastructure C2 is activated.

Figure 23:
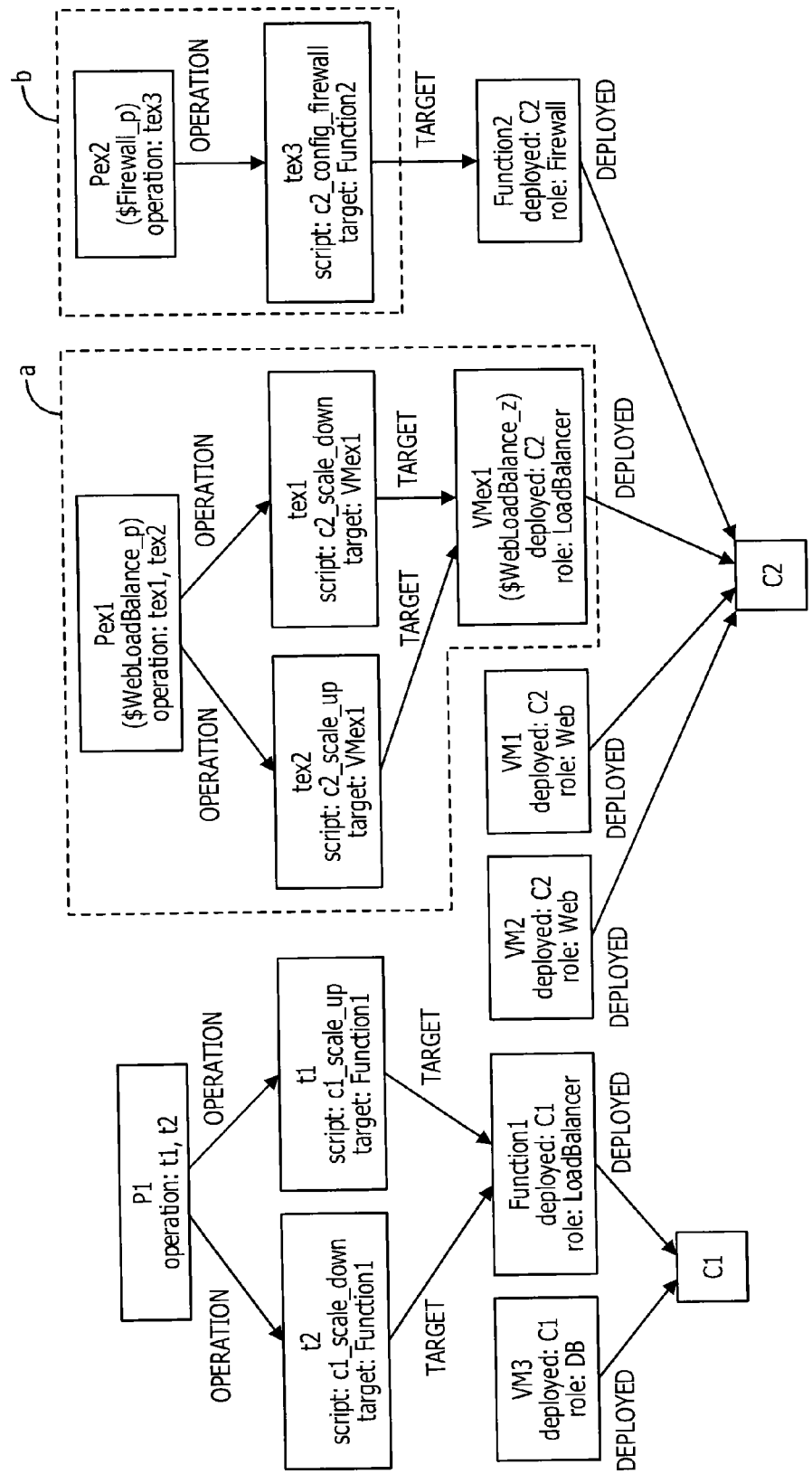
FIG. 23 is a diagram for illustrating a specific example of the change process.

In such a case, the constraint satisfaction analysis unit 110 outputs an implementation example in a case where the conditions are satisfied, which is illustrated in FIG. 23, to the after-change process unit 111. In the example of FIG. 23, the portion surrounded by dotted line a includes a load distribution VM (VMex1) as the additional resource and the auto-scaling (Pex1: WebLoadBalance) as the additional operational process. The task is split into two tasks of the scaling-up and the scaling-down. This enables the auto-scaling in the cloud infrastructure C2. Further, the portion surrounded by dotted line b includes the firewall setting (Pex2: Firewall) as the additional operational process. This portion includes only one task of the firewall setting. The other portions illustrate the configuration resulting from the change as they are. However, the function of the load balancer that is no more used remains on the cloud infrastructure C1.

In step S31, in a case where the values p and r reach the preset upper limit values, the after-change process unit 111 stores a message that the system configuration and the operational process which satisfy the conditions may not be identified in the output data storage unit 112. Then, the output unit 113 outputs the message stored in the output data storage unit 112 to the output device (step S35). The process then finishes.

Figure 24:
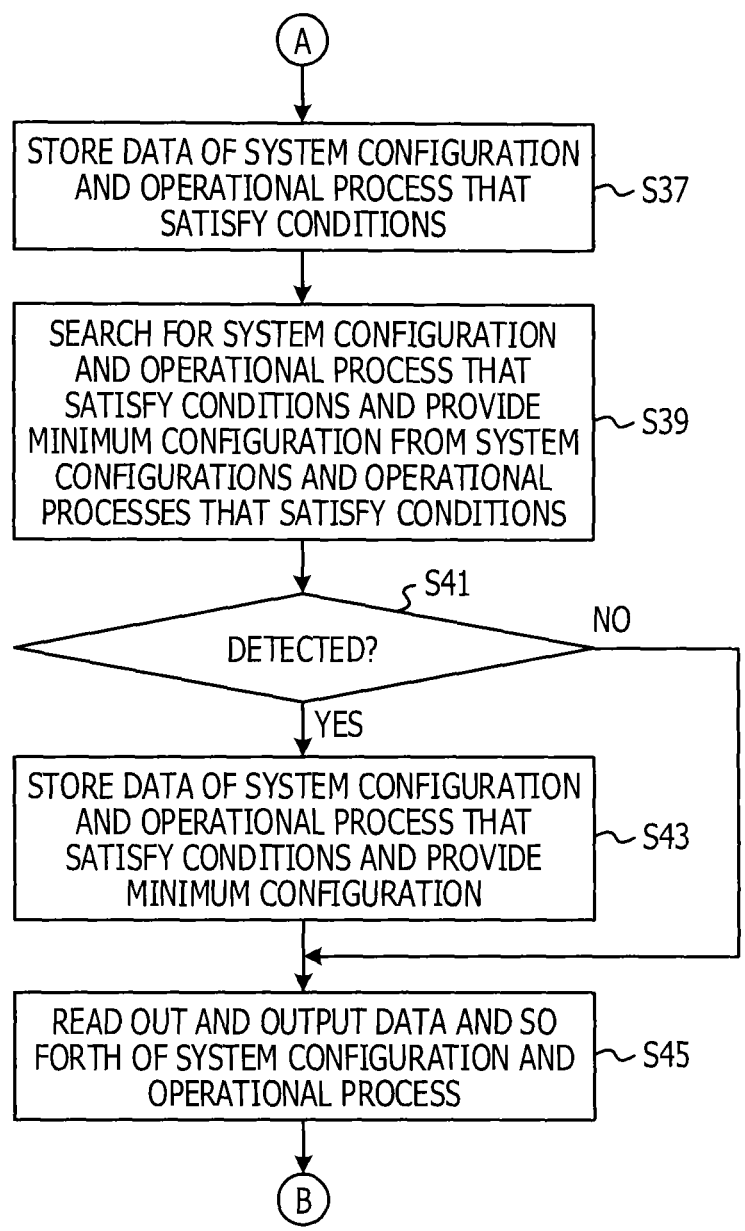
FIG. 24 is a diagram that illustrates a process flow of the change process.

Moving to a description of the process of FIG. 24 via the terminal A, the after-change process unit 111 stores the data of the system configurations and the operational processes that satisfy the conditions, which are received from the constraint satisfaction analysis unit 110, in the second data storage unit 106, for example (step S37).

In addition, the after-change process unit 111 searches for the system configuration and the operational process that satisfy the conditions and provide a minimum configuration from the system configurations and the operational processes that satisfy the conditions (step S39).

More specifically, the after-change process unit 111 deletes certain operational processes or resources from the system configurations and the operational processes that satisfy the conditions and causes the constraint satisfaction analysis unit 110 to determine whether or not such a state satisfies the conditions. For example, the after-change process unit 111 selects, in round-robin manner, the operational processes, resources, or both of those to be deleted and thereby identifies the system configuration and the operational process that satisfy the conditions and provide the minimum configuration.

Figure 25:
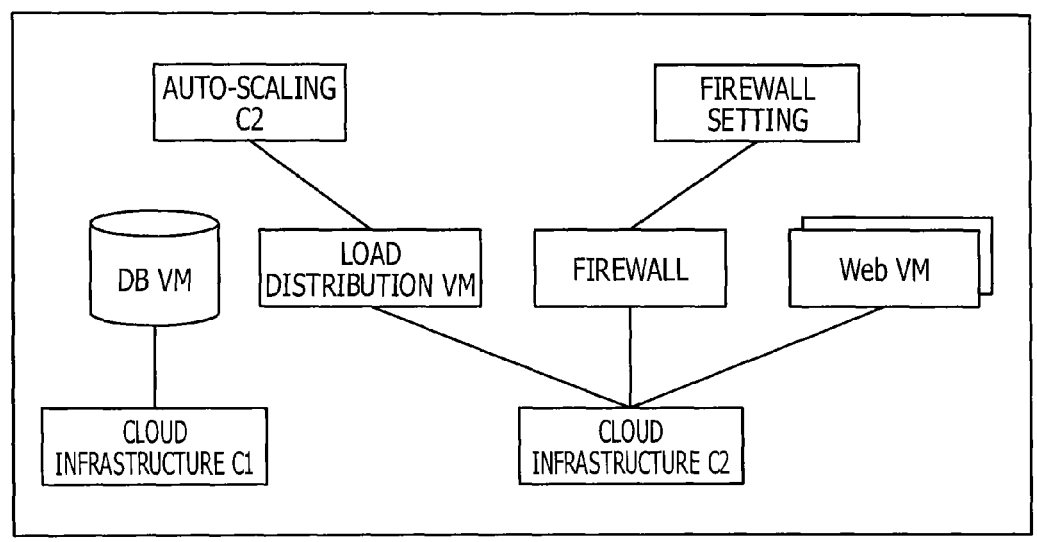
FIG. 25 is a diagram for illustrating a specific example of the change process.

In the above-described example, the auto-scaling of the web VM does not have to be provided on the cloud infrastructure C1. As schematically illustrated in FIG. 25, a determination is thus made that the conditions are satisfied until the operational process and functions for the auto-scaling on the cloud infrastructure C1 are deleted. Any further deletion of the operational processes or resources results in a determination that the conditions are not satisfied with respect to any state.

Accordingly, in a case where the system configuration and the operational process that satisfy the conditions and provide the minimum configuration are not detected (step S41: No route), the process moves to step S45.

On the other hand, in a case where the system configuration and the operational process that satisfy the conditions and provide the minimum configuration are detected (step S41: Yes route), the after-change process unit 111 stores the data of the system configuration and the operational process that satisfy the conditions and provide the minimum configuration in the output data storage unit 112 (step S43).

Then, the output unit 113 reads out the data and so forth of the system configuration and the operational process that are stored in the output data storage unit 112 and outputs the data and so forth to the output device (step S45). The process then finishes via a terminal B.

For example, the added operational processes and resources and the operational processes and resources that are deleted in step S39 may be displayed in a distinguishable manner. For example, ways such as coloring and addition of a frame may be used.

In a case where plural configurations that satisfy the conditions are identified, all of those may be output. Further, a certain cost is specified, and the configurations that satisfy the conditions may thereby be arranged in order of the cost.

As described above, the operational administrator may beforehand verify the feasibility of the system change that the operational administrator plans. In addition, further changes that are desired in accordance with the system change are automatically extracted. Thus, the further changes may be utilized for a revision of the plan of the system change.

The embodiment of this disclosure has been described in the foregoing. However, this disclosure is not limited to the embodiment. This embodiment is compatible with a case where initial VM images are different between the clouds, for example.

Further, the function block configuration illustrated in FIG. 1 is merely one example and may not correspond with a program module configuration. Further, the above-described process flows are merely examples. Unless the process results change, the process orders may be switched, and plural steps may be executed in parallel.

Figure 26:
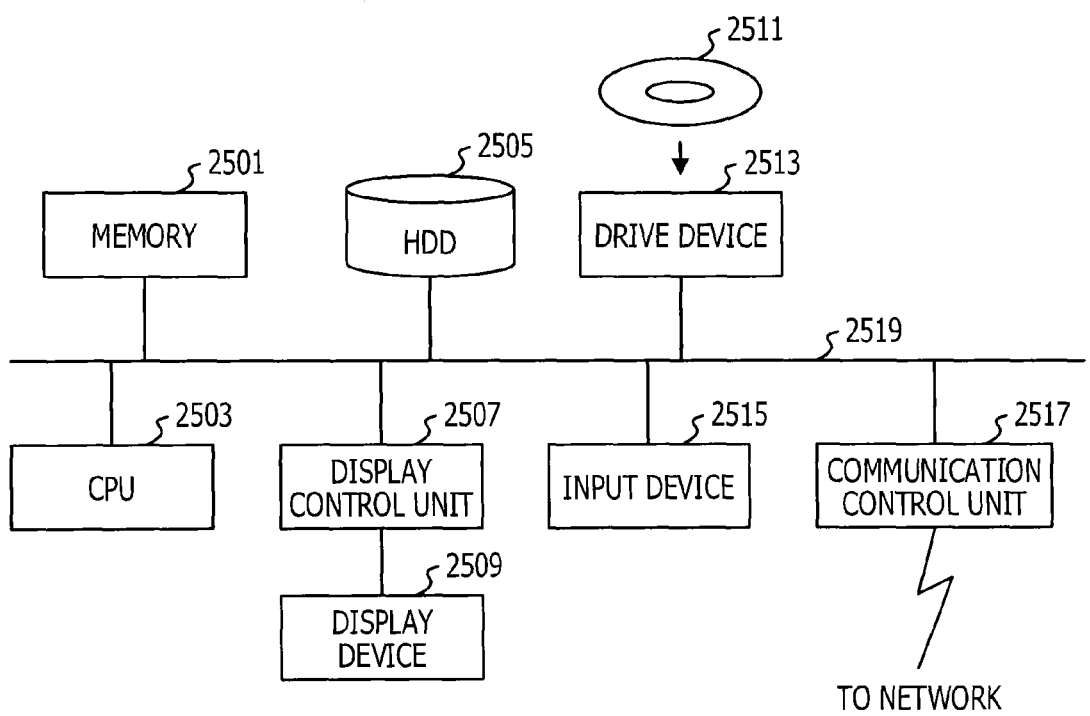
FIG. 26 is a function block diagram of a computer.

The above-described information processing device 100 is a computer device. As illustrated in FIG. 26, a memory 2501, a central processing unit (CPU) 2503, a hard disk drive (HDD) 2505, a display control unit 2507 that is connected with a display device 2509, a drive device 2513 for a removable disk 2511, an input device 2515, and a communication control unit 2517 for connecting with a network are connected together by a bus 2519. An operating system (OS) and application programs for conducting the processes in this embodiment are stored in the HDD 2505 and read out from the HDD 2505 to the memory 2501 when the OS and the application programs are executed by the CPU 2503. The CPU 2503 controls and causes the display control unit 2507, the communication control unit 2517, and the drive device 2513 to perform prescribed operations in accordance with process contents of the application programs. Further, data that are being processed are mainly stored in the memory 2501 but may be stored in the HDD 2505. In the embodiment of this technology, the application programs for conducting the above-described processes are stored in the computer-readable removable disk 2511, distributed, and installed in the HDD 2505 through the drive device 2513. The application programs may be installed in the HDD 2505 via a network such as the Internet and the communication control unit 2517. Such a computer device realizes above-described various functions by organized cooperation of hardware such as the CPU 2503 and the memory 2501 and programs such as the OS and the application programs, which are described above.

The above-described embodiment will be summarized as follows.

A determination method according to this embodiment includes (A) a process of receiving an inquiry about a change from a first virtual system which includes a virtual machine to a second virtual system, (B) a process of extracting a functional requirement about a function that is realized by the first virtual system based on configuration data of the first virtual system, (C) a process of extracting an operational requirement that realizes the first virtual system based on data about an operational process and the functional requirement that are used for the first virtual system, and (D) a process of determining feasibility of the change to the second virtual system based on the functional requirement, the operational requirement, and constraint conditions that are identified by configuration elements of the second virtual system.

This allows a plan of a change of the virtual system to be verified beforehand. That is, support for the user about the system change is realized. The constraint conditions that are identified by the configuration elements of the second virtual system are constraint conditions about the cloud that are derived from a change of a deployment destination cloud of the virtual machine, for example.

The above-described process of extracting the operational requirement may include (c1) a process of extracting a pattern in which the first virtual system satisfies first and second requirements from plural patterns about the operational requirement, each of which includes the first requirement for a function to be included in the virtual system and the second requirement for an operational process to be used in relation to the function, based on the functional requirement and data about the operational process used for the first virtual system. Such plural patterns are prepared beforehand, and the operational requirement may thereby be easily extracted.

In addition, the above-described process of determining may include (d1) a process of generating a functional requirement resulting from the change by applying the change to the second virtual system to the functional requirement and (d2) a process of determining whether or not a configuration identified by data about a functional requirement and an operational process that result from the change satisfies constraint conditions identified by the operational requirement and the configuration elements of the second virtual system. An existing constraint satisfaction analysis scheme (that is, the solver) may be used as a specific scheme of determination.

In addition, the determination method may further include (E) a process of searching for at least one of a function to be added to the second virtual system and an operational process to be used for the second virtual system in a case where a negative determination is made about the change to the second virtual system in the process of determining the feasibility of the change to the second virtual system. For example, a scheme of determining whether the conditions are satisfied while gradually increasing functions or operational processes is possible. Such a process enables recognition of what kind of further change is desired for the change to the second virtual system.

Further, the above-described process of searching may include (e1) a process of deleting at least one of the function and the operational process that have no influence on satisfaction of the operational requirement and the constraint conditions identified by the configuration elements of the second virtual system from at least one of the function to be added to the second virtual system and the operational process to be used for the second virtual system and the configuration identified by the data about the functional requirement and the operational process that result from the change. A redundant function or operational process may be retained in a case of increasing functions and operational processes. Thus, a determination is made whether the conditions are satisfied while the functions and the operational processes are gradually decreased, and the just sufficient configuration for satisfaction of the conditions may thereby be obtained.

A program that causes a computer to conduct the above-described processes may be created. The program is stored in a computer-readable storage medium or storage device such as a flexible disk, an optical disk such as a CD-ROM, a magneto-optical disk, a semiconductor memory (for example, a ROM), and a hard disk, for example. Data that are being processed are temporarily kept in a storage device such as a RAM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A determination method executed by a computer, the determination method comprising:
receiving a request of a change from a first system configured by a first configuration to a second system configured by a second configuration, the request of the change including configuration data related to the first configuration and change data related to the change from the first configuration to the second configuration;
extracting a functional requirement for a function that is realized in the first system based on the configuration data;
identifying an operational requirement for realizing the first system based on the functional requirement and data about an operational process that is used for the first system;
identifying a constraint condition about the second system based on configuration elements of the second configuration that are identified by the configuration data and the change data; and
determining feasibility of the change to the second system based on the functional requirement, the operational requirement, and the constraint condition.

2. The determination method according to claim 1, wherein
the first system and the second system are virtual systems in which virtual machines operate.

3. The determination method according to claim 1, wherein
the operational requirement is a pattern that satisfies both of a first requirement and a second requirement, and is identified based on the functional requirement and the data of the operational process,
the first requirement is related to a function to be included in the first system, and
the second requirement is related to an operational process to be used in relation to the function.

4. The determination method according to claim 1, further comprising:
generating another functional requirement that results from the change by applying the change to the second system to the functional requirement related to the first system; and
determining whether a configuration satisfies the operational requirement and the constraint condition, the configuration being identified by the other functional requirement and the data of the operational process.

5. The determination method according to claim 1, further comprising:
identifying at least one of a function to be added to the second system and an operational process to be used for the second system when it is determined that the change to the second system is not feasible.

6. The determination method according to claim 5, wherein
the identifying of the at least one of the function and the operational process deletes a certain function and a certain operational process that have no influence on satisfaction of the operational requirement and the constraint condition from a configuration that is identified by another functional requirement and the data of the operational process.

7. A determination device comprising:
a memory; and
a processor coupled to the memory and configured to:
receive a request of a change from a first system configured by a first configuration to a second system configured by a second configuration, the request of the change including configuration data related to the first configuration and change data related to the change from the first configuration to the second configuration, extract a functional requirement for a function that is realized in the first system based on the configuration data, identify an operational requirement for realizing the first system based on the functional requirement and data about an operational process that is used for the first system, identify a constraint condition about the second system based on configuration elements of the second configuration that are identified by the configuration data and the change data, and determine feasibility of the change to the second system based on the functional requirement, the operational requirement, and the constraint condition.

8. The determination device according to claim 7, wherein the first system and the second system are virtual systems in which virtual machines operate.

9. The determination device according to claim 7, wherein the operational requirement is a pattern that satisfies both of a first requirement and a second requirement, and is identified based on the functional requirement and the data of the operational process, the first requirement is related to a function to be included in the first system, and the second requirement is related to an operational process to be used in relation to the function.

10. The determination device according to claim 7, wherein the processor is configured to:

generate another functional requirement that results from the change by applying the change to the second system to the functional requirement related to the first system, and determine whether a configuration satisfies the operational requirement and the constraint condition, the configuration being identified by the other functional requirement and the data of the operational process.

11. The determination device according to claim 7, wherein the processor is configured to:

identify at least one of a function to be added to the second system and an operational process to be used for the second system when it is determined that the change to the second system is not feasible.

12. The determination device according to claim 11, wherein the at least one of the function and the operational process is identified by deleting a certain function and a certain operational process that have no influence on satisfaction of the operational requirement and the constraint condition from a configuration that is identified by another functional requirement and the data of the operational process.

13. A non-transitory storage medium storing a determination program which causes a computer to execute a procedure, the procedure comprising:

receiving a request of a change from a first system configured by a first configuration to a second system configured by a second configuration, the request of the change including configuration data related to the first configuration and change data related to the change from the first configuration to the second configuration;

extracting a functional requirement for a function that is realized in the first system based on the configuration data;

identifying an operational requirement for realizing the first system based on the functional requirement and data about an operational process that is used for the first system;

identifying a constraint condition about the second system based on configuration elements of the second configuration that are identified by the configuration data and the change data; and determining feasibility of the change to the second system based on the functional requirement, the operational requirement, and the constraint condition.

14. The non-transitory storage medium according to claim 13, wherein the first system and the second system are virtual systems in which virtual machines operate.

15. The non-transitory storage medium according to claim 13, wherein the operational requirement is a pattern that satisfies both of a first requirement and a second requirement, and is identified based on the functional requirement and the data of the operational process, the first requirement is related to a function to be included in the first system, and the second requirement is related to an operational process to be used in relation to the function.

16. The non-transitory storage medium according to claim 13, the procedure further comprising:

generating another functional requirement that results from the change by applying the change to the second system to the functional requirement related to the first system; and determining whether a configuration satisfies the operational requirement and the constraint condition, the configuration being identified by the other functional requirement and the data of the operational process.

17. The non-transitory storage medium according to claim 13, the procedure further comprising:

identifying at least one of a function to be added to the second system and an operational process to be used for the second system when it is determined that the change to the second system is not feasible.

18. The non-transitory storage medium according to claim 17, wherein the identifying of the at least one of the function and the operational process deletes a certain function and a certain operational process that have no influence on satisfaction of the operational requirement and the constraint condition from a configuration that is identified by another functional requirement and the data of the operational process.

* * * * *